(12) United States Patent
Li et al.

(10) Patent No.: US 6,310,972 B1
(45) Date of Patent: Oct. 30, 2001

(54) SHAPE ADAPTIVE TECHNIQUE FOR IMAGE AND VIDEO COMPRESSION

(75) Inventors: Weiping Li, Bethlehem, PA (US); Shipeng Li, Hightstown, NJ (US)

(73) Assignee: Competitive Technologies of PA, Inc., Bethlehem, PA (US)

( * ) Notice: Subject to any disclaimer, the term of this patent is extended or adjusted under 35 U.S.C. 154(b) by 0 days.

(21) Appl. No.: 08/884,338

(22) Filed: Jun. 27, 1997

Related U.S. Application Data

(60) Provisional application No. 60/020,768, filed on Jun. 28, 1996.

(51) Int. Cl.[7] .................................................. G06K 9/36
(52) U.S. Cl. .............................................................. 382/232
(58) Field of Search .................................. 382/232, 239, 382/240, 243, 242, 248; 364/724.05, 724.13, 724.14; 708/400, 316, 317; 375/240; 341/71, 79; 348/398.1, 437.1, 438.1

(56) References Cited

U.S. PATENT DOCUMENTS

| | | | |
|---|---|---|---|
| 5,412,741 | * 5/1995 | Shapiro | 382/232 |
| 5,436,985 | 7/1995 | Li | 382/253 |
| 5,546,477 | * 8/1996 | Knowles et al. | 382/242 |
| 5,604,824 | * 2/1997 | Chui et al. | 382/248 |
| 5,748,786 | * 5/1998 | Zandi et al. | 382/240 |
| 5,828,849 | * 10/1998 | Lempel et al. | 709/247 |
| 5,901,249 | * 5/1999 | Ito | 382/239 |

OTHER PUBLICATIONS

Vaidyanathan, P., "Multirate Systems And Filter Banks", Ch. 11 The wavelet transform and its relation to multirate filter banks, pp. 457–538, Prentice Hall, 1993.

* cited by examiner

*Primary Examiner*—Joseph Mancu
*Assistant Examiner*—Ali Bayat
(74) *Attorney, Agent, or Firm*—Martin Novack

(57) ABSTRACT

A method for encoding an image-representative signal, including the following steps: for shapes of the image, applying a transform to a segment of pixels of the shape to obtain a low pass transform component and a high pass transform component; and for segments with an odd number of pixels, including the odd pixel in the low pass transform component and excluding the odd pixel from the high pass transform component.

11 Claims, 18 Drawing Sheets

SHAPE ADAPTIVE TECHNIQUE FOR IMAGE AND VIDEO COMPRESSION

RELATED APPLICATION

This application claims priority from U.S. Provisional Patent Application No. 60/020,768, filed Jun. 28, 1996, and said Provisional Patent Application is incorporated herein by reference.

FIELD OF THE INVENTION

This invention relates to compression of image-representative signals and, more particularly, to a method and apparatus for encoding and decoding image-representative signals.

BACKGROUND OF THE INVENTION

Image-representative signals can be digitized, encoded, and subsequently decoded in a manner which substantially reduces the number of bits necessary to represent a decoded reconstructed image without undue or noticeable degradation in the reconstructed image. Coding methods that use transforms, for example wavelet transforms, are well known in this art.

One known approach to image compression is to identify individual objects in an image and to encode information about each object for subsequent recovery at a decoder. Techniques are known for specifying the shape and location of the object, such as by producing a bitmap which precisely defines which pixels are within the object (e.g. by using 1's within the object and 0's outside the object). As is also known, the object can be represented by a wavelet transform which, in conjunction with the known techniques of eliminating certain transformed information, results in a compressed encoded bit stream that can be decoded for reconstruction of the object with substantial saving of bandwidth. However, there are several problems encountered when transforming the pixels of an object with a wavelet transform. As will be described further herein, problems are encountered in handling boundaries and doing so in a way that maintains the integrity of the coding without being wasteful of bandwidth. For small objects, or small shape features of larger objects, the handling of coding at boundaries under certain conditions can have a very substantial effect on compression efficiency.

It is among the objects of the present invention to provide improved techniques and apparatus for encoding objects of arbitrary shape to achieve efficient image compression.

DETAILED DESCRIPTION

Figure 1:
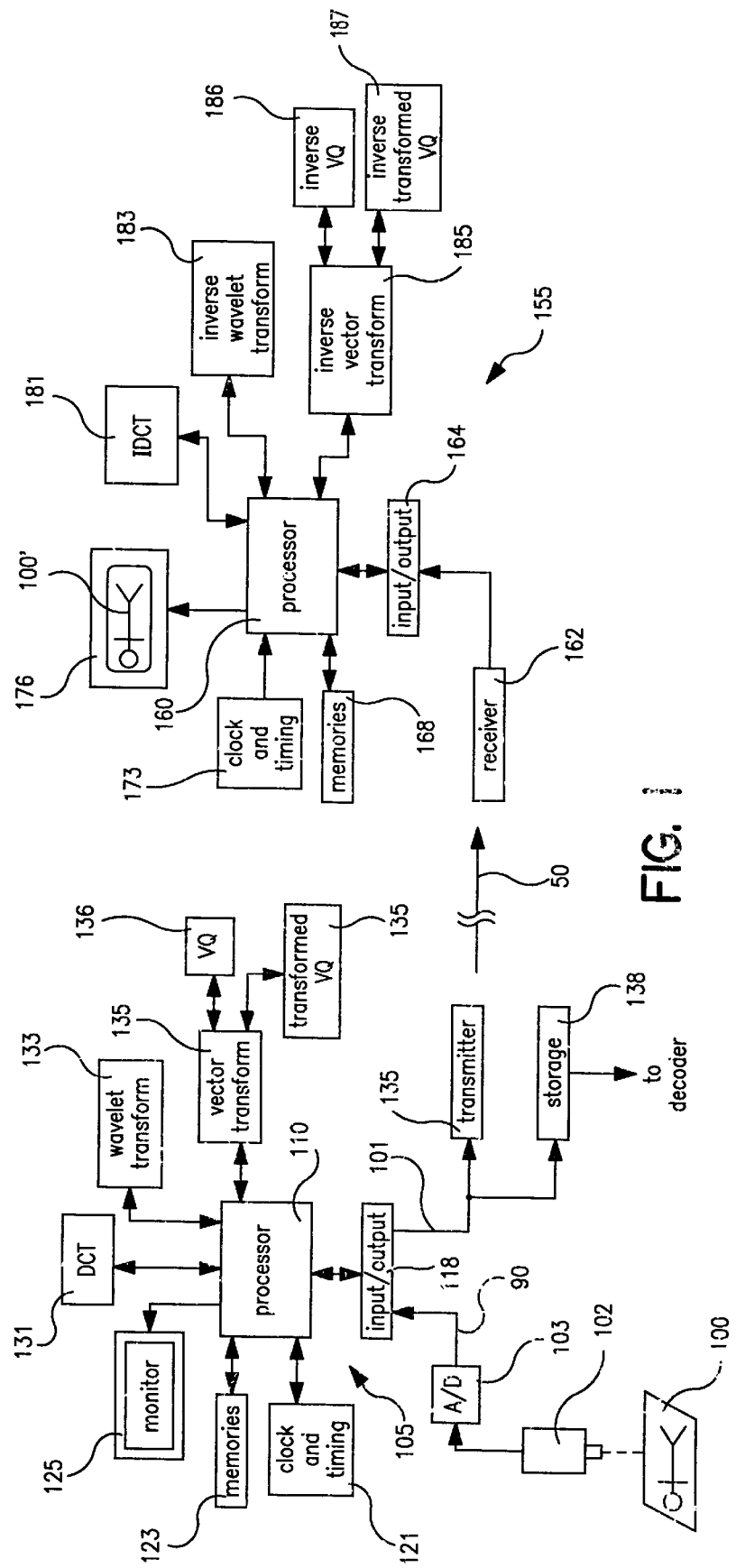
FIG. 1 is block diagram of an apparatus which can be used in practicing embodiments of the invention for encoding and decoding images.

Referring to FIG. 1, there is shown a block diagram of an apparatus which can be used in practicing embodiments of the invention for encoding and decoding images 100. A scanner or a video camera 102, or other source of video signal, produces an array of pixel-representative signals that are coupled to an analog-to-digital converter 103, which is, in turn, coupled to the processor 110 of an encoder 105. When programmed in the manner to be described, the processor 110 and its associated circuits can be used to implement embodiments of the invention. The processor 110 may be any suitable processor, for example an electronic digital processor or microprocessor. It will be understood that any general purpose or special purpose processor, or other machine or circuitry that can perform the functions described herein, electronically, optically, or by other means, can be utilized. The processor 110, which for purposes of the particular described embodiments hereof can be considered as the processor or CPU of a general purpose electronic digital computer, such as a Model Ultra-1 sold by Sun Microsystems, Inc., will typically include memories 123, clock and timing circuitry 121, input/output functions 118 and monitor 125, which may all be of conventional types. In the present embodiment blocks 131, 133 and 135 represent functions that can be implemented in hardware, software, or a combination thereof. Reference can be made to copending U.S. patent application Ser. No. 08/884,440 filed of even date herewith and assigned to the same assignee as the present application. The block 131 represents an optional digital cosine transform function that can be implemented using commercially available DCT chips or combinations of such chips with known software, and the block 133 represents a wavelet transform, part of which can be implemented using commercially available wavelet transform chips, or combinations of such chips with known software. Part of this function will be the shape adaptive discrete wavelet transform described herein. The block 135 represents a vector transform function that can be implemented in accordance with the routines set forth in U.S. Pat. No. 5,436,985 (incorporated herein by reference) or hardware equivalents. As described in said '985 Patent, vector quantization (represented by block 136) can be employed as part of optional VT coding. The vector quantization can be lattice VQ, for example of the type described in copending U.S. patent application Ser. No. 08/733,849, filed Oct. 18, 1996, and copending U.S. patent application Ser. No. 08/743,631, filed Nov. 4, 1996, both assigned to the same assignee as the present application, and both incorporated herein by reference. A transformed VQ (represented by block 137) is described hereinbelow. The encoder can also be provided with known means for generating and encoding shape information, for example consistent with MPEG-4.

With the processor appropriately programmed, as described hereinbelow, an encoded output signal 101 is produced which is a compressed version of the input signal 90 and requires less bandwidth and/or less memory for storage. In the illustration of FIG. 1, the encoded signal 101 is shown as being coupled to a transmitter 135 for transmission over a communications medium (e.g. air, cable, fiber optical link, microwave link, etc.) 50 to a receiver 162. The encoded signal is also illustrated as being coupled to a storage medium 138, which may alternatively be associated with or part of the processor subsystem 110, and which has an output that can be decoded using the decoder to be described.

Coupled with the receiver 162 is a decoder 155 that includes a similar processor 160 (which will preferably be a microprocessor in decoder equipment) and associated peripherals and circuits of similar type to those described in the encoder. These include input/output circuitry 164, memories 168, clock and timing circuitry 173, and a monitor 176 that can display decoded video 100'. Also provided are blocks 181, 183 and 185 that represent functions which (like their counterparts 131, 133 and 135 in the encoder) can be implemented in hardware, software, or a combination thereof. The block 181 represents an optional inverse digital cosine transform function that can be implemented using commercially available IDCT chips or combinations of such chips with known software, and the block 183 represents an inverse wavelet transform function, part of which can be implemented using commercially available inverse wavelet transform chips, or combinations of such chips with known software. Part of this function will be decoding for the shape adaptive discrete wavelet transform hereof. The block 185 represents an inverse vector transform function that can be implemented in accordance with the routines set forth in the above-referenced U.S. Pat. No. 5,436,985 or hardware equivalents. As described in said '985 Patent, inverse vector quantization (represented by block 186) is employed as part of the inverse VT coding. The inverse vector quantization can be inverse lattice VQ, for example of the type described in the above referenced copending U.S. patent application Ser. Nos. 08/733,849 and 08/743,631. The decoder can also be provided with known means for decoding received shape information.

Figure 18:
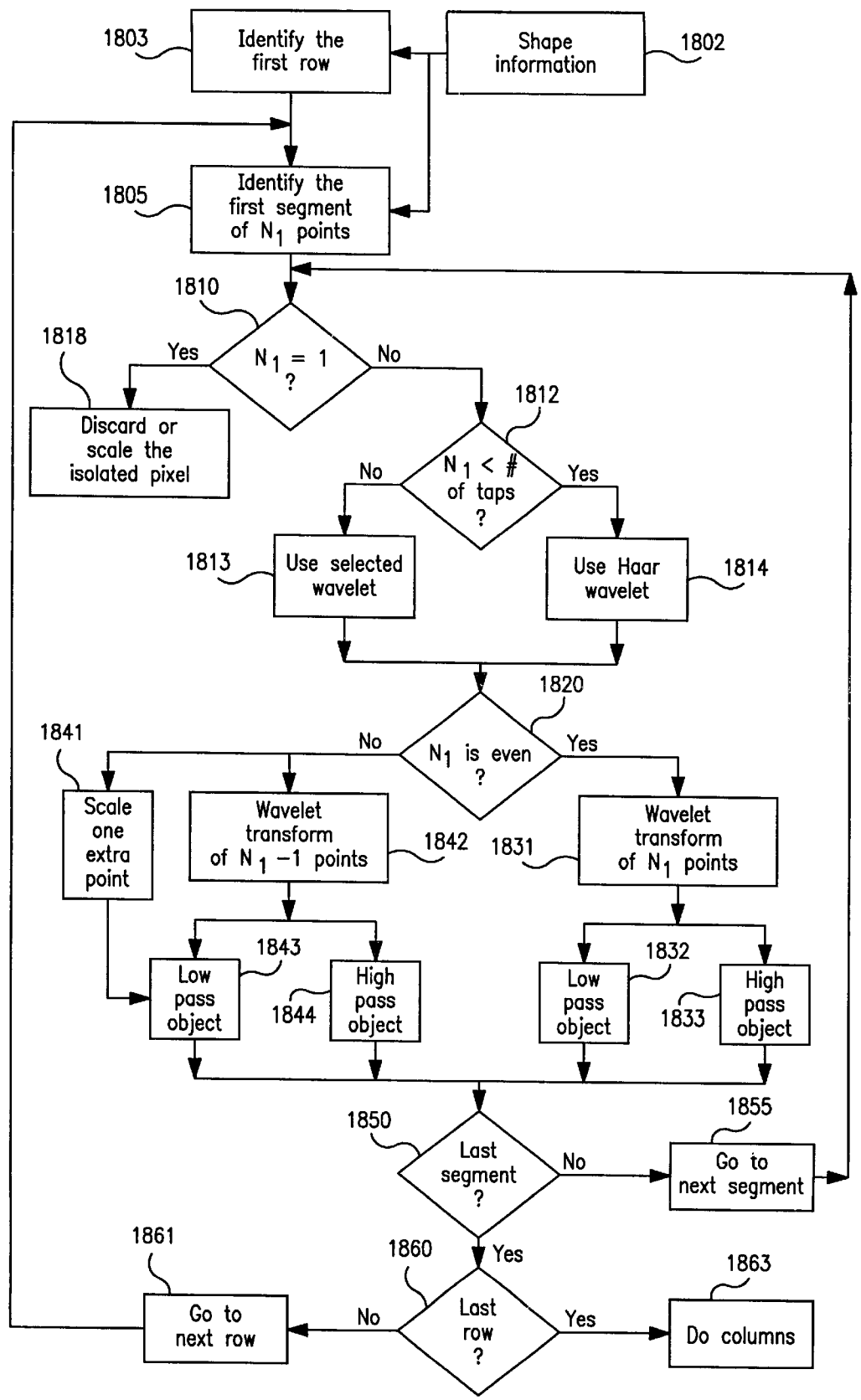
FIG. 18 is a flow diagram of a procedure for a shape adaptive transform.

A form of the procedure for shape adaptive wavelet transform can be described as follows and is shown in a flow diagram of FIG. 18.

within each frame, use shape information to identify the first row of pixels belonging to the object to be transformed (blocks 1802 and 1803);

within each row, identify the first segment of consecutive pixels (blocks 1802 and 1805);

if the number of consecutive pixels, $N_1$, is an even number, a wavelet transform is performed on the $N_1$ pixels and $N_1/2$ wavelet coefficients are generated for the low-pass and high-pass objects respectively and placed into the corresponding locations according to the shape information (blocks 1820, 1831, 1832, and 1833);

if $N_1$ is an odd number, a wavelet transform is performed on the first $N_1-1$ pixels and $(N_1-1)/2$ wavelet coefficients are generated for the low-pass and high-pass objects respectively and placed into the corresponding locations according to the shape information (blocks 1842, 1843 and 1844);

the left-over pixel in the previous step is scaled and grouped into the low-pass object at the end of the segment (block 1841);

if $N_1$ is less than the number of taps of the wavelet filter and greater than 1, the Haar wavelet is used (blocks 1812 and 1814), otherwise, another wavelet is selected (blocks 1812 and 1813);

if $N_1=1$, the isolated pixel may be discarded or scaled (blocks 1810 and 1818);

perform the above operations until the number of wavelet decomposition is reached;

perform the above operations for the next segment of consecutive pixels in each row (blocks 1850 and 1855);

perform the above operations for the next row of pixels;

perform the above operations for each column of the low-pass and high-pass objects.

Since the subsampled small objects may not have exactly the same number of pixels (blocks 1860 and 1861), the vectors formed by the boundary wavelet coefficients may have fewer valid components than the vectors in the middle of the object. In order to make such boundary vectors fit into the statistics of the other vectors, the mean of the valid components is used for the missing components.

This method ensures that the number of vectors to be coded in the transform domain is exactly the same as that in the image domain. The treatment of odd number of pixels in a segment ensures that the total energy in the transform domain is exactly the same as that in the image domain. Therefore, coding efficiency on the boundary vectors is the same as that on the vectors in the middle of the object.

Figure 2:
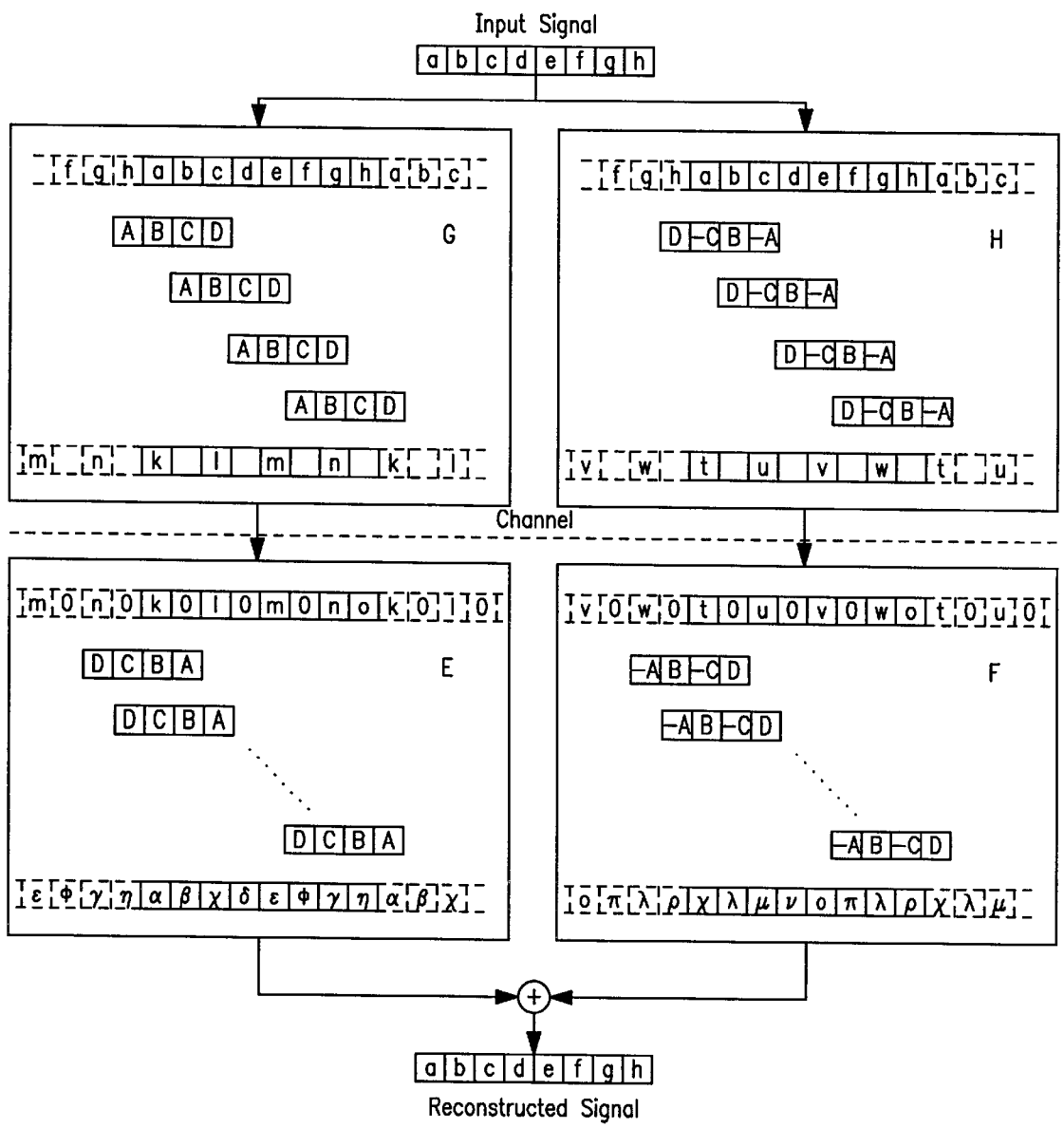
FIG. 2 illustrates an example of how a signal of an even number of pixels can be transformed using orthogonal transforms and then reconstructed using prior art technique.
Figure 3E:
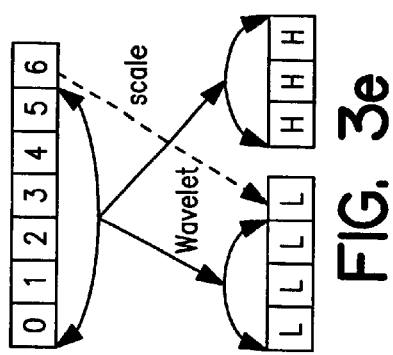
FIG. 3 illustrates a technique used in a form of the invention.
Figure 3D:
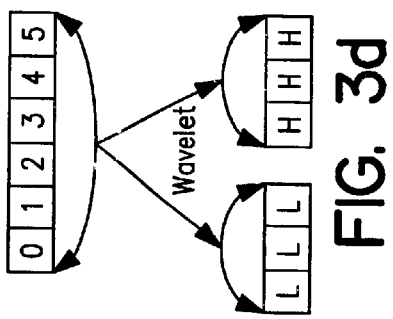
Figure 3C:
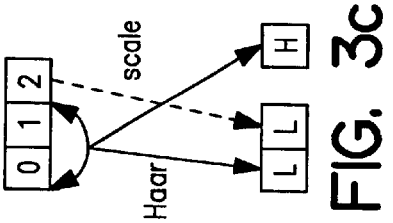
Figure 3B:
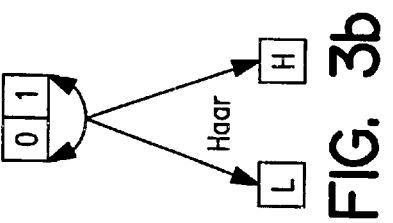
Figure 3A:
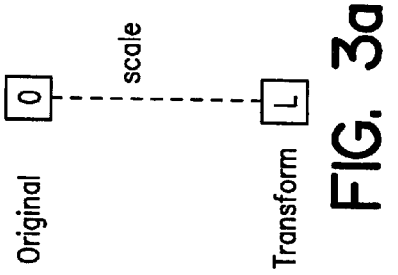

FIG. 2 illustrates an example of how a signal of an even number of pixels (input signal "abcdefgh", with a pixel length of eight) can be transformed using orthogonal wavelet transforms and then reconstructed using prior art technique. As shown in diagram G, the (low pass) wavelet or filter function weightings applied to the signal is designated ABCD and the orthogonal wavelet or filter function used for the high pass transform, shown in diagram H, is D(−C)B(−A). The input signal data sequence is shown with a so-called periodic extension; that is, with the end of the sequence preceding the beginning thereof and vice versa. In other words, the beginning of the sequence is preceded by hgf and the end of the sequence is succeeded by abc, etc. The wavelet is shown as being shifted two samples to the right at a time, since there is effective decimation in the result in each of the two transformation components in any event. The decimated results, klmn (with periodic extension) and a tuvw (with periodic extension) are respectively shown in the blocks G and H. These encoded signals are represented as being transmitted over a channel (downward pointing arrows crossing the dashed line), and the blocks E and F, together with an adder, are illustrated as implementing the decoding to reconstruct the signal, namely pixels abcdefgh.

The orthogonal wavelets used for reconstruction are seen to be designated with weighting factors DCBA (in block E) and (−A)B(−C)D (in block F). The signals to be decoded are seen to have zeros at the decimation positions, and the wavelet functions move one sample at a time, and produce the results represented by the respective Greek letter sequences at the bottoms of blocks E and F, respectively (each with periodic extension), and these are added to recover the reconstructed signal.

FIG. 3 illustrates one of the techniques used in a form of the invention. In each of the diagrams [(a) through (e)] the top portion shows the sequence to be wavelet transformed and the bottom portion shows the low and high pass transformed components. In diagram (a) there is only one pixel, and it results in just the scaled L. In diagram (b), there are two pixels, and the Haar wavelet transform is conventionally used to obtain L and H. In diagram (c) there are three pixels, and this situation of an odd number of pixels is handled as follows: the first two pixels are transformed as in the previous case (b). Then, the third pixel is taken by itself as a further low pass transform signal, but with the appropriate scaling, which would be $1/\sqrt{2}$ for the Haar case. Diagrams (d) and (e) are similar to (b) and (c), respectively, but for an even case of six pixels and an odd case of seven pixels, the latter case resulting in the scaled extra pixel becoming the fourth L in the transform part of the diagram.

Figure 4:
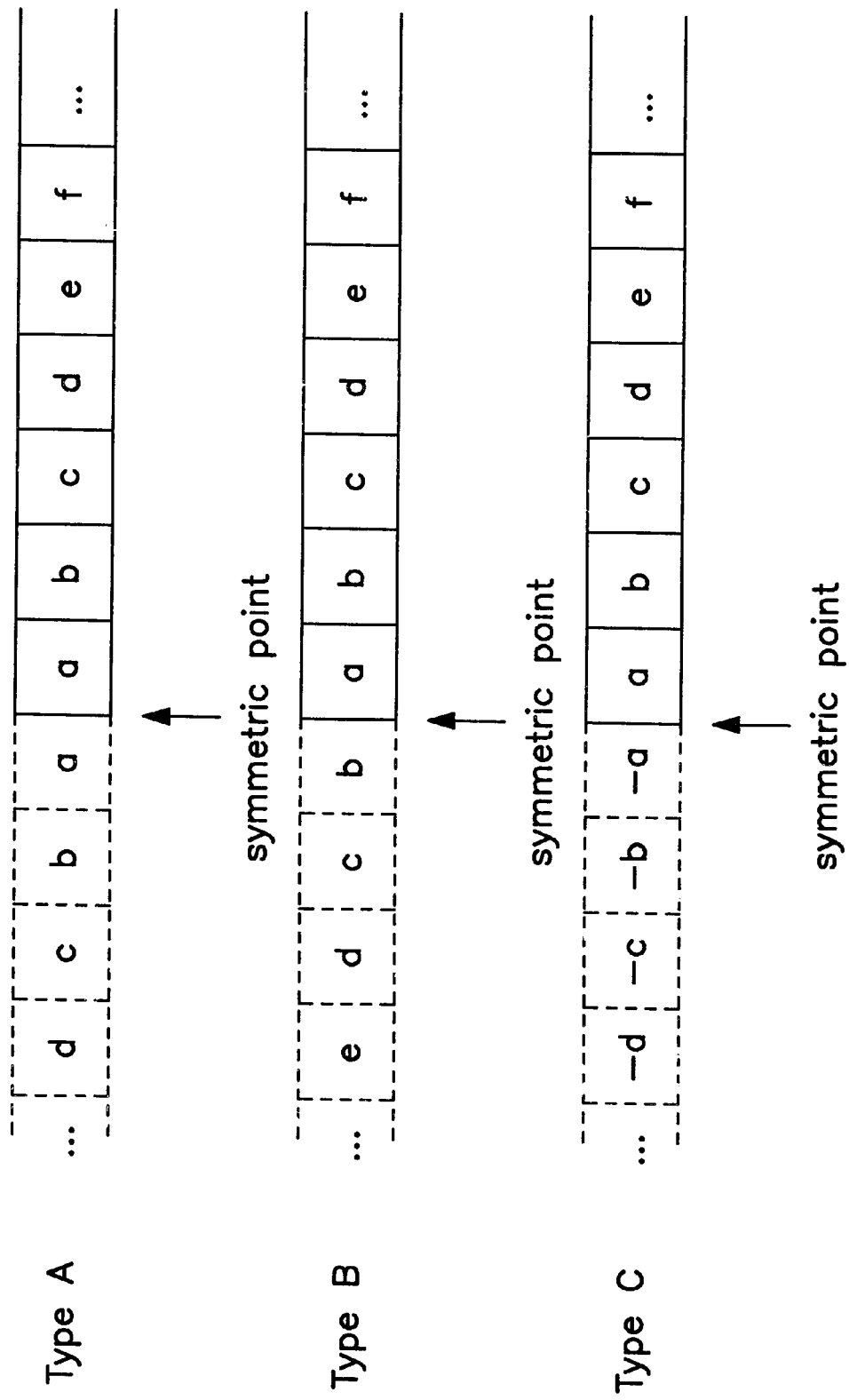
FIG. 4 illustrates three known types of symmetric extensions for leading boundaries.
Figure 5:
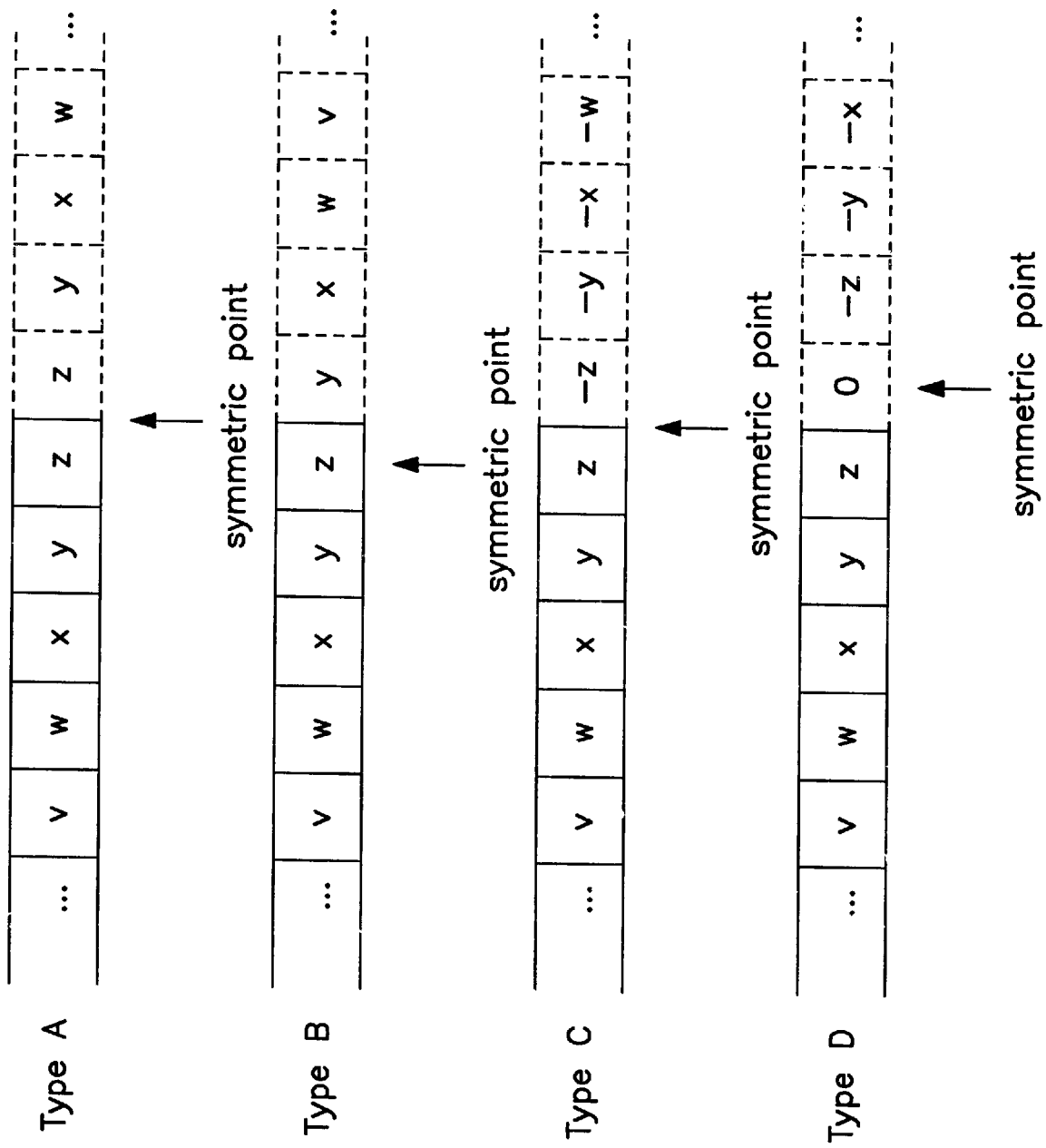
FIG. 5 illustrates three known types of symmetric extension for a trailing boundary.

FIG. 4 illustrates three known types of symmetric extensions for leading boundaries (type A, type B and type C, respectively), and FIG. 5 illustrates three known types of symmetric extension for a trailing boundary (type A, type B and type C, respectively). [Reference can be made, for example, to "Multirate Systems And Filter Banks", P. Vaidyanathan, Prentice Hall, 1993, for this and other prior art portions referenced herein with regard to extensions and wavelets.] FIG. 5 also shows a fourth type of symmetric extension (called type D) which is used to advantage in an embodiment hereof (see e.g. FIG. 9 below).

Figure 6:
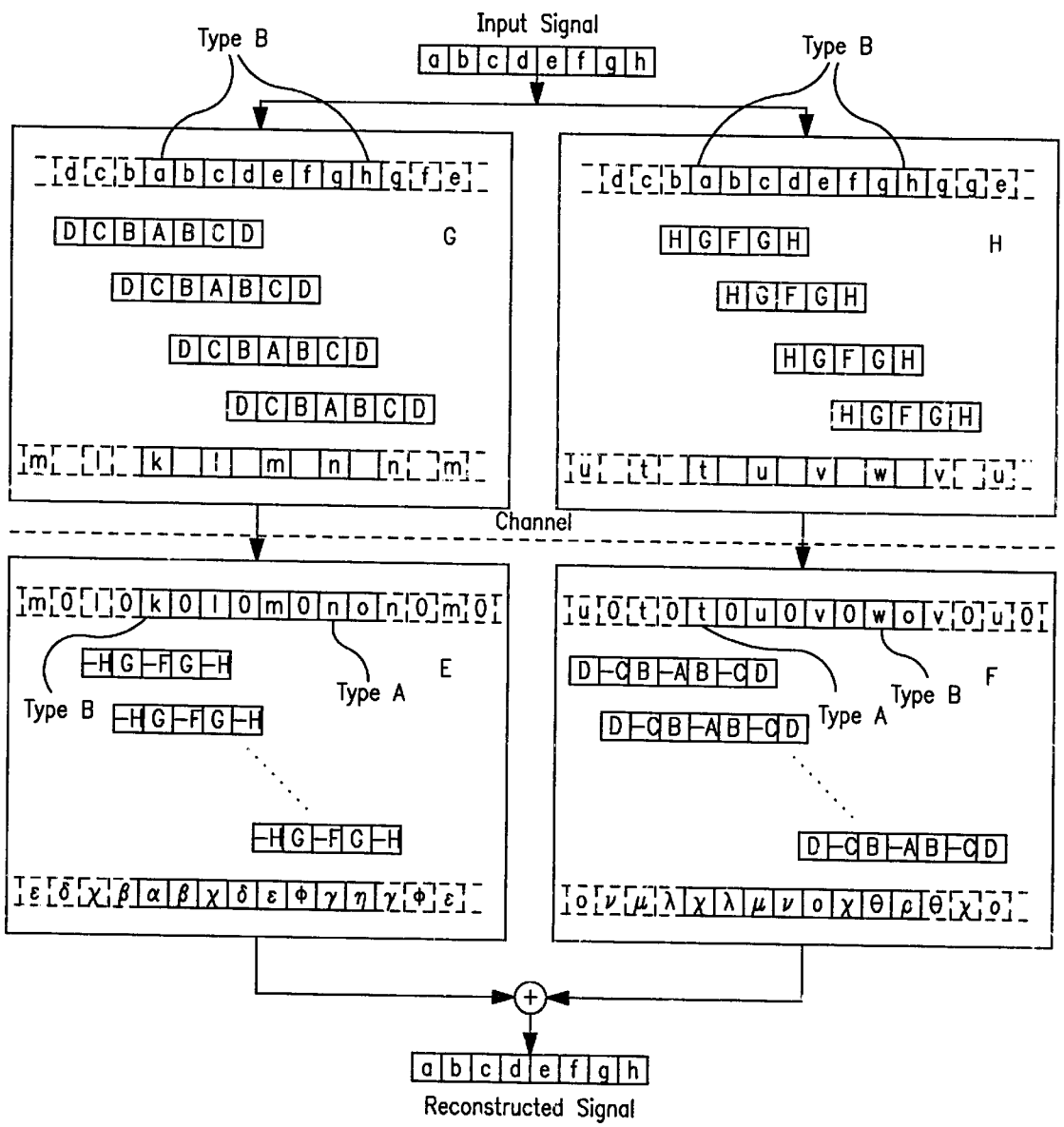
FIGS. 6 and 7 show two cases of wavelet transforms as used in the prior art for wavelet transformation of even length data.
Figure 7:
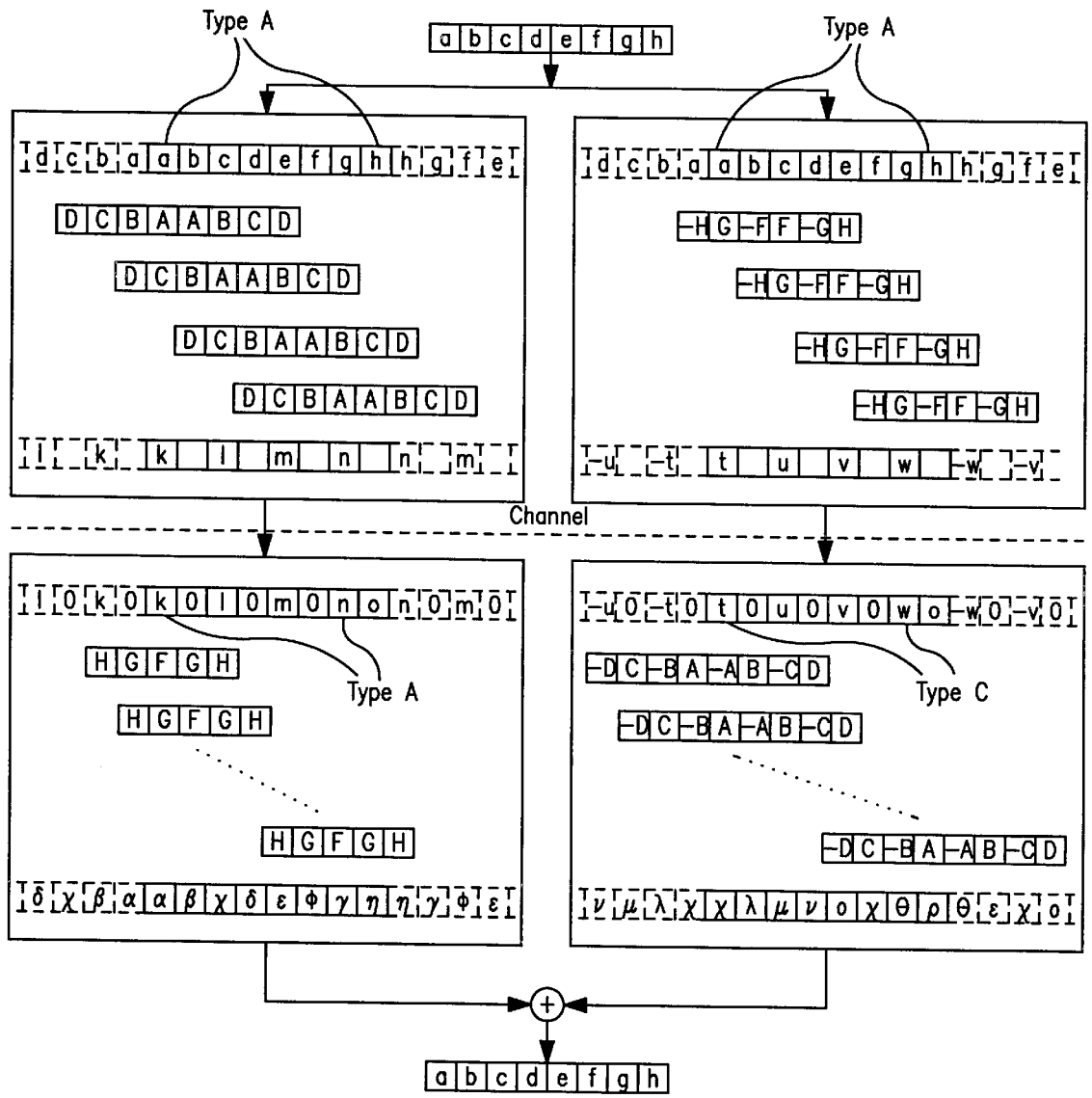

FIGS. 6 and 7 show two cases of wavelet transforms (in these cases, bi-orthogonal wavelets with symmetric filter coefficients) as used in the prior art for wavelet transformation of even length data (the input signal in this case being the eight pixels abcdefgh). The types of extensions used are indicated in the Figures. In FIG. 6 (which employs an odd length filter), type B extensions are used for both the leading and trailing boundaries for the input data. The encoded low pass data (which is upsampled, as indicated by the inserted zeros) has a type B extension at the leading boundary and a type A extension at the trailing boundary. The high pass encoded data (also upsampled) has a type A extension at the leading boundary and type B extension at the trailing boundary. In FIG. 7 (which employs an even length filter), type A extensions are used at the leading and trailing boundaries of the input data. A type A extension is used at both the leading and trailing boundaries of the low pass encoded data (which is upsampled), and a type C extension is used at both the leading and trailing boundaries of the high pass encoded data (which is also upsampled).

Figure 8:
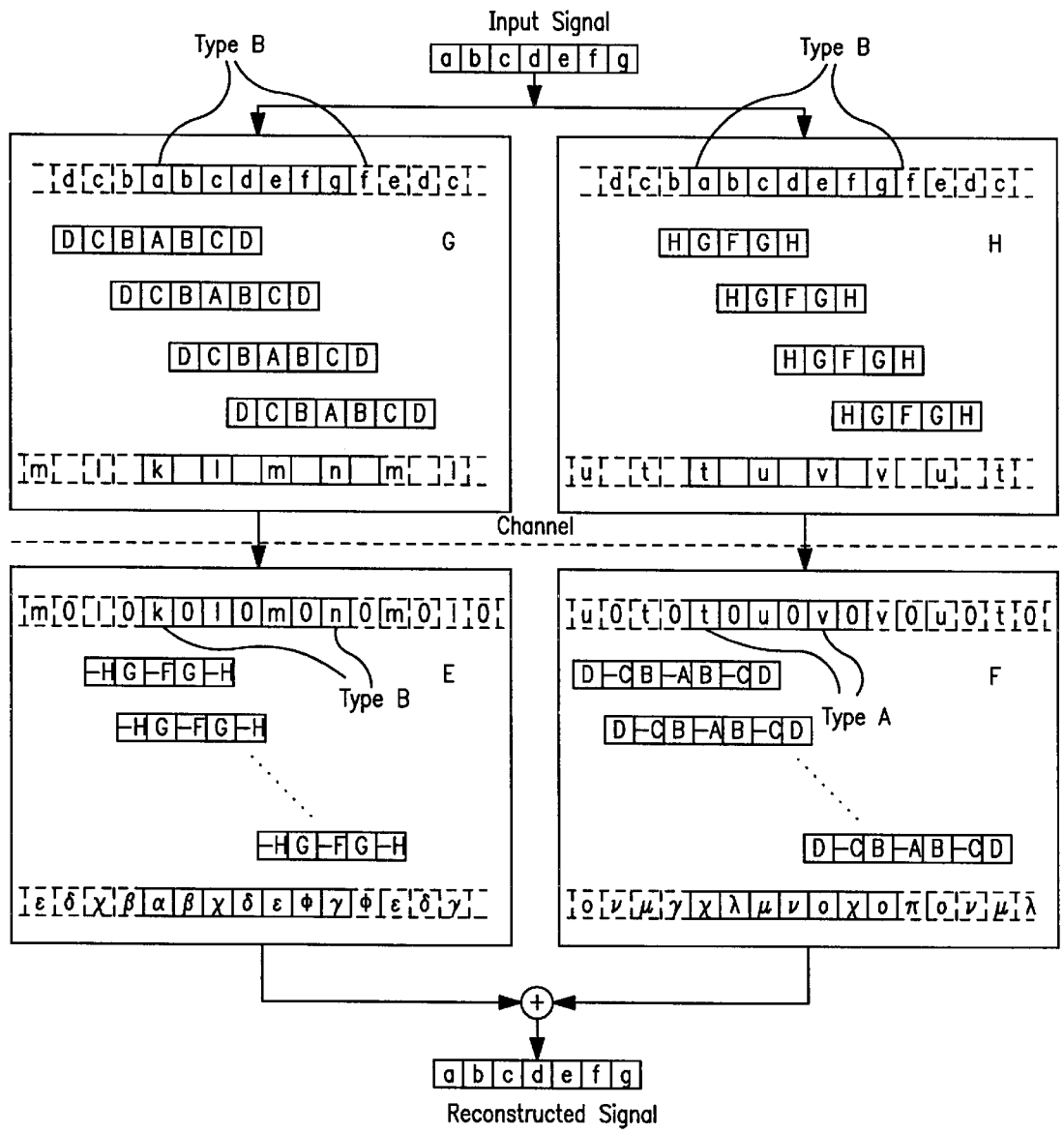
FIGS. 8 and 9 show wavelet transforms as in FIGS. 6 and 7, which again used bi-orthogonal wavelets with symmetric filter coefficients.
Figure 9:
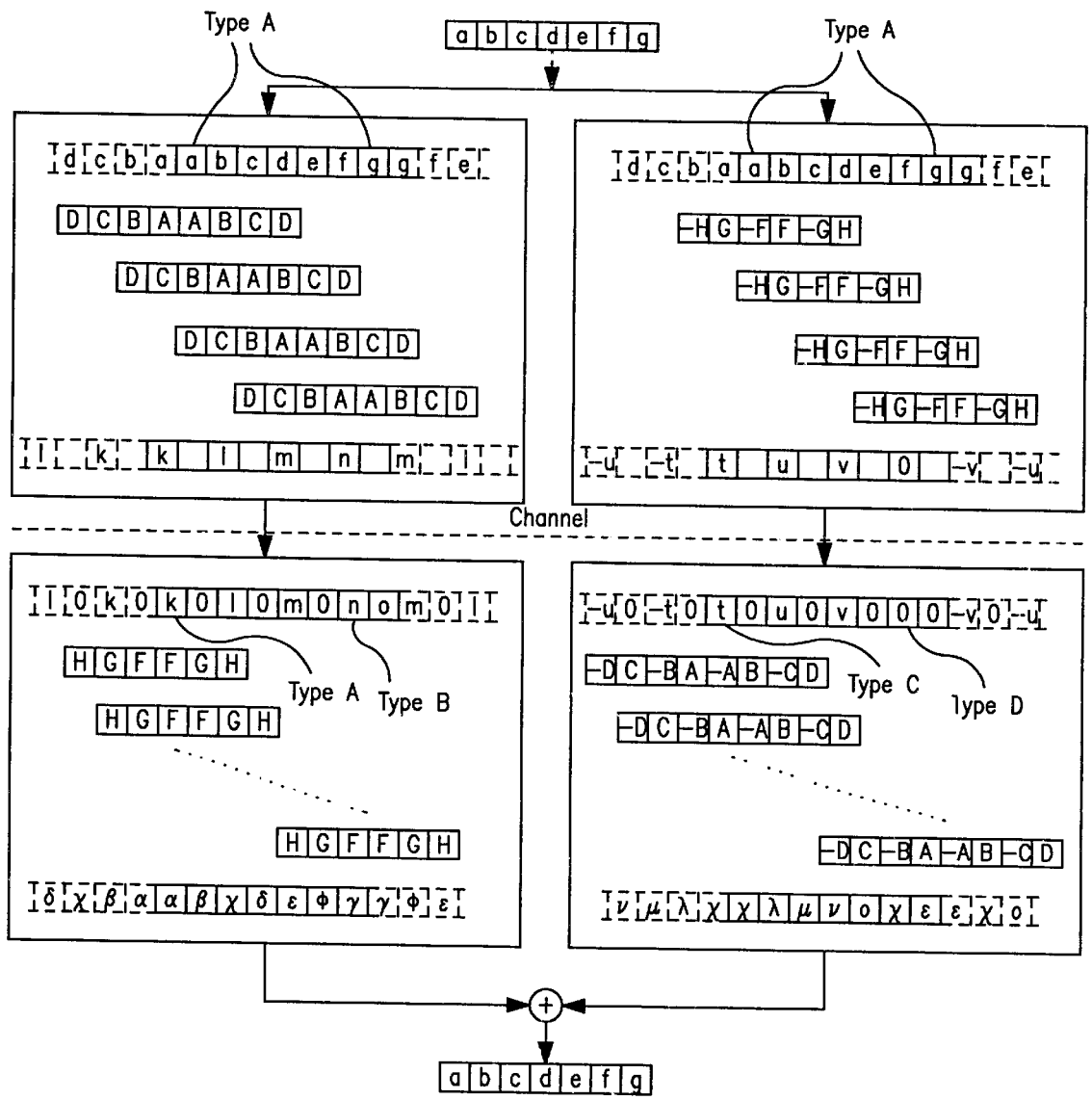

FIGS. 8 and 9 show wavelet transforms as in FIGS. 6 and 7, which again use bi-orthogonal wavelets with symmetric filter coefficients. In these cases, however, in accordance with the principles hereof, odd length data is handled in an advantageous way. The case of FIG. 8 uses an odd length filter on odd length data and the case of FIG. 9 uses an even length filter on odd length data. In FIG. 8 it can be noted that the high pass encoded data has one less point in the output than the low pass encoded data (that is, three points for the high pass transform versus four points for the low pass transform). In this case, the decoding operations use type B extensions at the leading and trailing boundaries of the low pass component (which is upsampled) and type A extensions at the leading and trailing boundaries of the encoded data (which is also upsampled) in the high pass component. FIG. 9 shows the case for an even length filter and odd length data, with the low pass transform again having an extra data point. As previously noted, a new "type D" extension is used in the high pass transform component.

Figure 10:
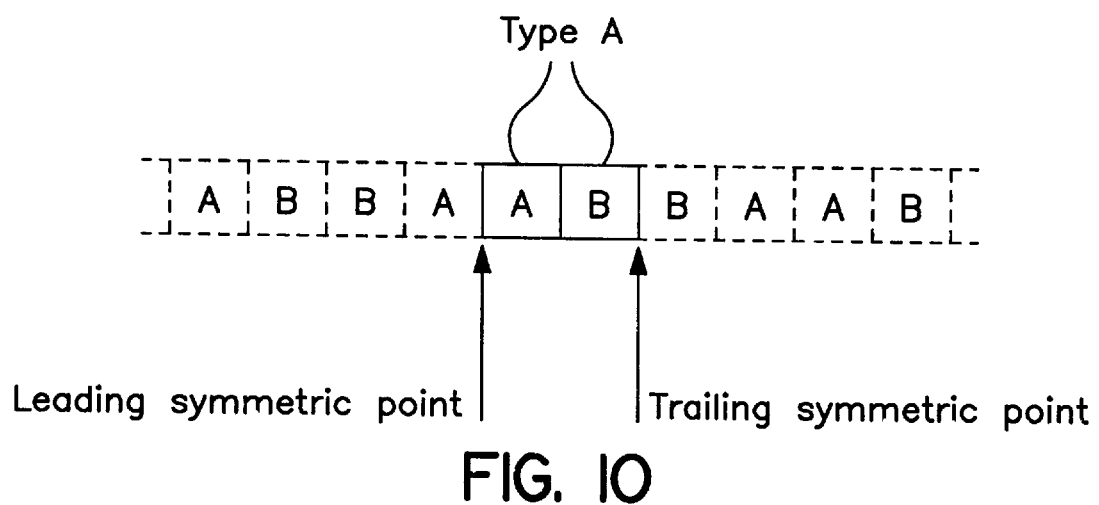
FIG. 10 illustrates how a short data sequence can be symmetrically extended for implementation of wavelet transformation using a filter that is longer than the data.

FIG. 10 illustrates how a short data sequence can be symmetrically extended for implementation of wavelet transformation using a filter that is longer than the data.

Figure 11C:
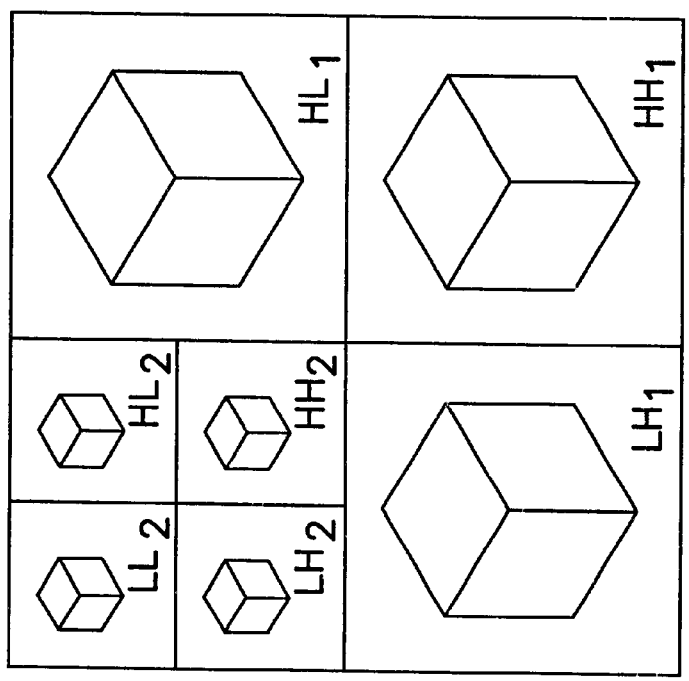
FIG. 11, which includes diagrams (a) and (b), shows how data on different lines of an object, which are not aligned vertically, can be positioned upon horizontal wavelet transformation such that the vertical component of wavelet transformation can be efficiently performed.
Figure 11A:
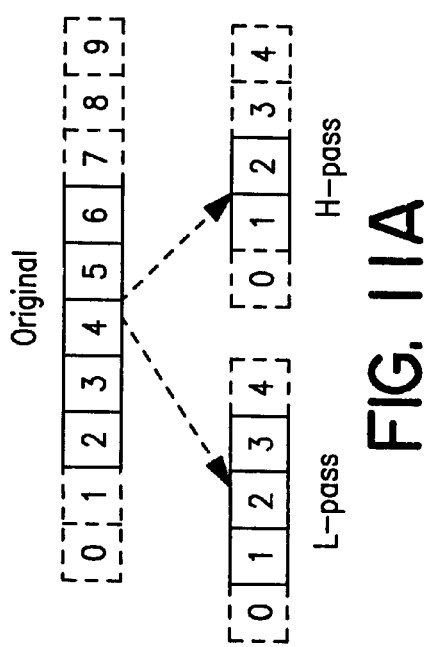
Figure 11B:
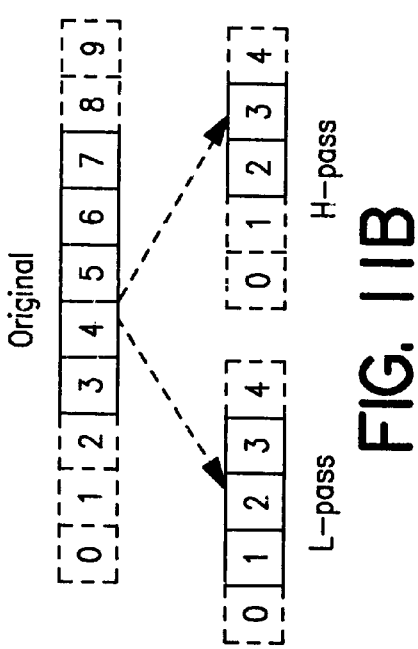

FIG. 11, in diagrams (a) and (b) shows, in accordance with a feature hereof, how data on different lines of an object, which are not aligned vertically (which is typical for an object of arbitrary shape) can be positioned upon horizontal wavelet transformation such that the vertical component of wavelet transformation can be efficiently performed. In both diagrams, the data points in dashed lined are "don't care" (outside the object). In diagram (a) both the low pass and high pass transformation components start at position 1, whereas in diagram (b) the low-pass transformation components starts at position 1 and the high pass starts at position 2. The diagram (c) illustrates a two dimensional wavelet decomposition.

Figure 12:
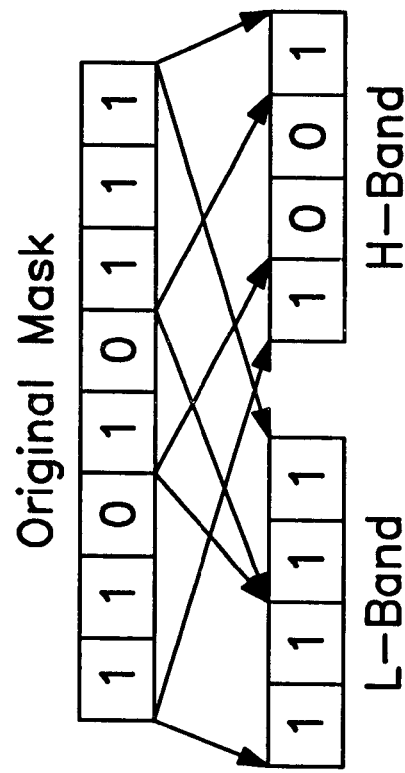
FIG. 12 illustrates the handling of situations where the data goes in and out of the object, such as may occur for an arbitrarily shaped object.
Figure 12:
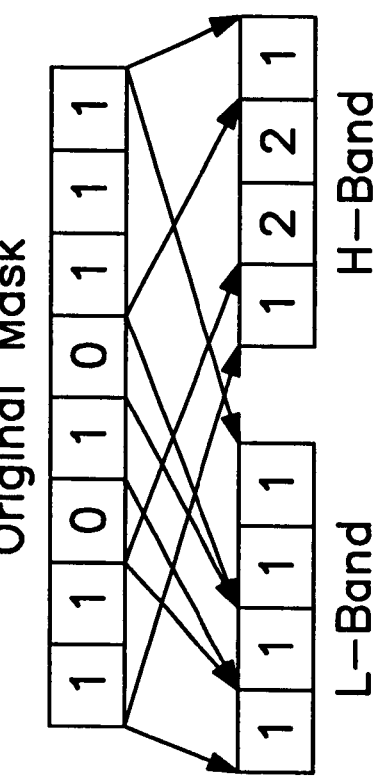
Figure 12:
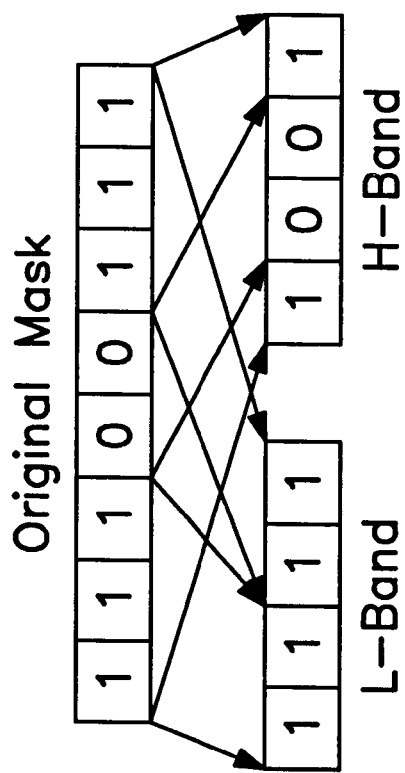
Figure 12:
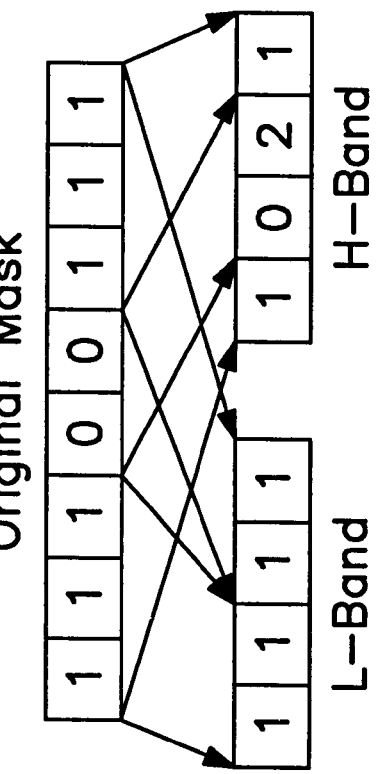

FIG. 12 shows the handling, in accordance with a feature hereof, of situations where the data (designated as original mask) goes in and out of the object, such as may occur for an arbitrarily shaped object, for example one having indentations in its outline. The two top diagrams show how two different lines of data (where 1 is within the object and 0 is outside the object) can result, after wavelet transformation, in the same encoded bit stream. This ambiguity can be eliminated by introduction of a further symbol (the 2 in the bottom diagrams) that permits distinction in the high pass band. This additionally coded symbol will not substantially increase bandwidth as it will only be needed for the indicated types of occurrences.

Figure 13:
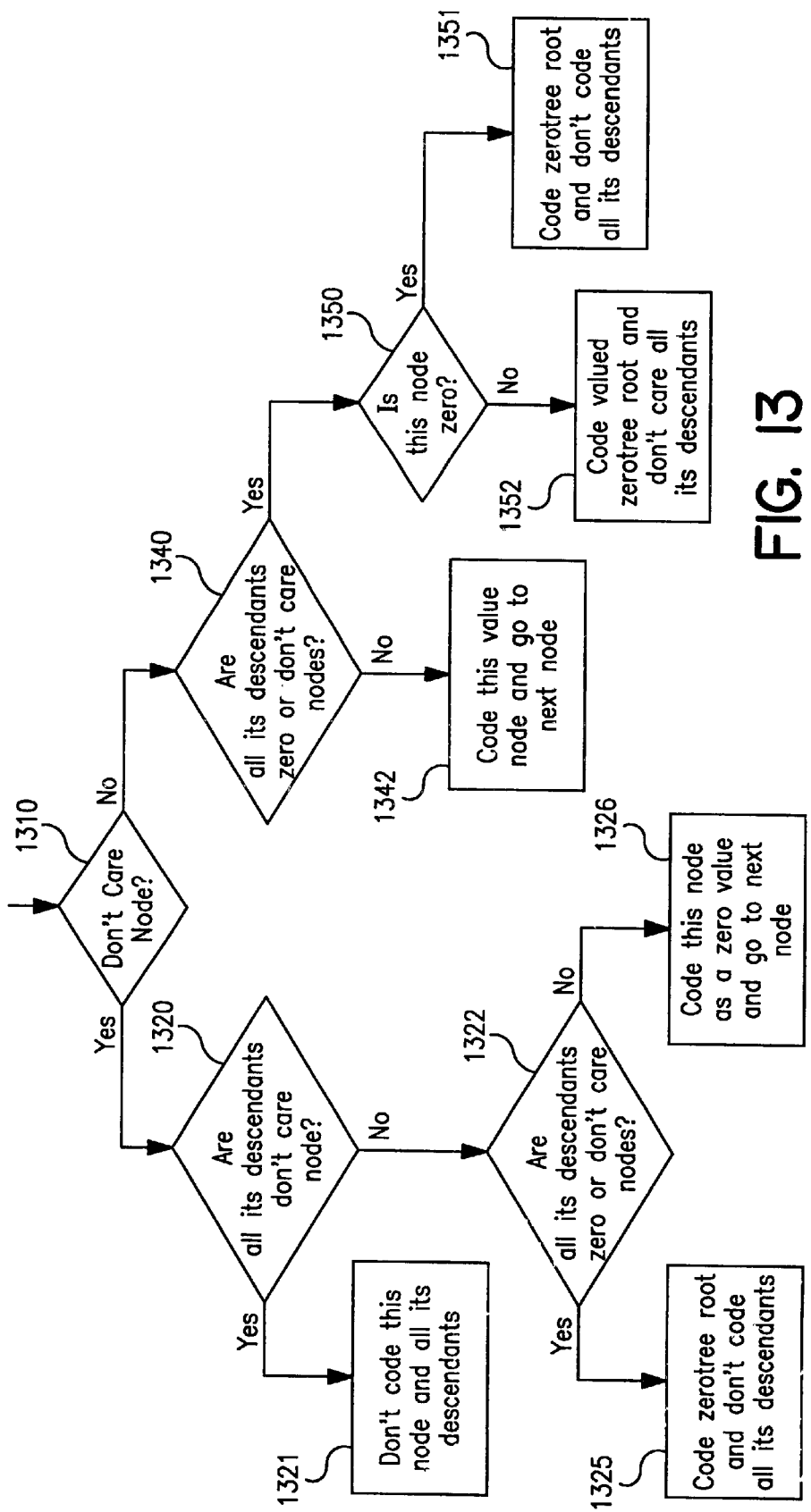
FIG. 13 is a flow diagram of a routine for programming the encoder processor to implement the coding to form a zero tree with "don't care" nodes.
Figure 16:
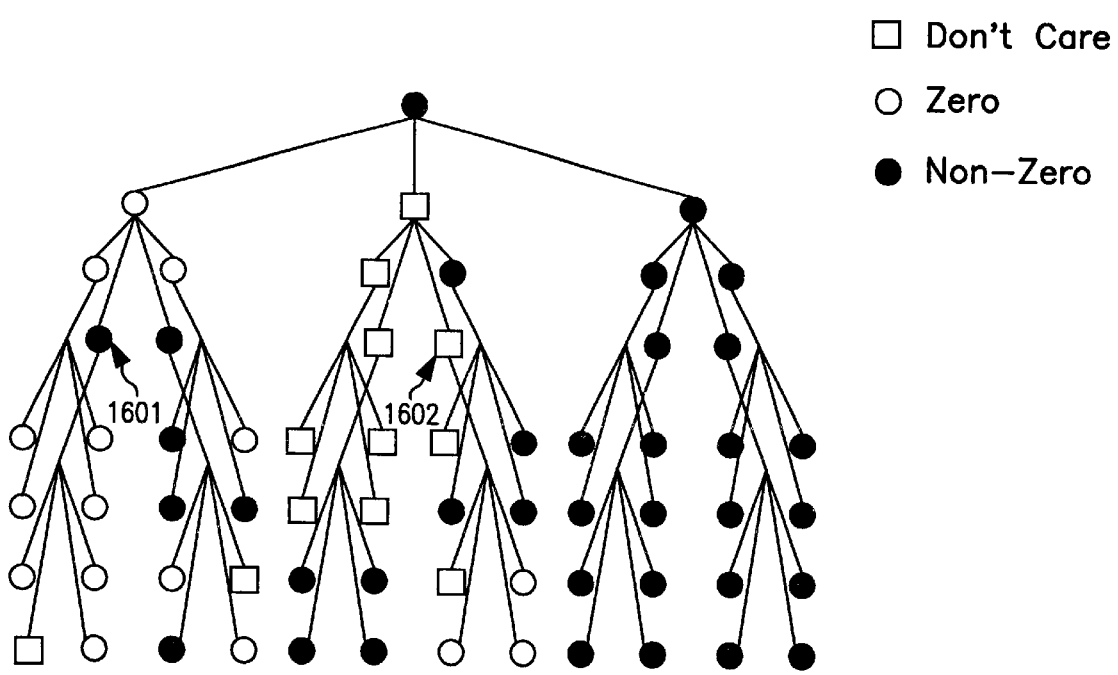
FIG. 16 shows an example of a zero tree with "don't care" nodes.

FIG. 13 is a flow diagram of a routine for programming the encoder processor to implement the coding to form a zero tree with "don't care" nodes, of the type shown in FIG. 16.

In FIG. 13, the block 1310 represents determination of whether the node is a don't care node. If so, detemination is made (block 1320) as to whether all its descendants are don't care nodes. If so, don't code this node and all its descendants (block 1321). If not, inquiry is made (block 1322) as to whether all descendants are zero or don't care nodes. If so, the zero tree root is coded and all descendants are not (block 1325). If not, this node is coded as a zero value and the process goes to the next node (block 1326). When the inquiry of the block 1310 was answered in the negative, an inquiry is made (block 1340) as to whether all descendants of the node are zero or don't care nodes. If not, the value of this node is coded and the process goes to the next node (block 1342). If so, inquiry is made (block 1350) as to whether this node is zero. If so, a zero tree root is coded as zero and the descendants are all not coded (block 1351). If not, the value is coded in the zero root tree and descendants are not coded (block 1352).

Figure 14:
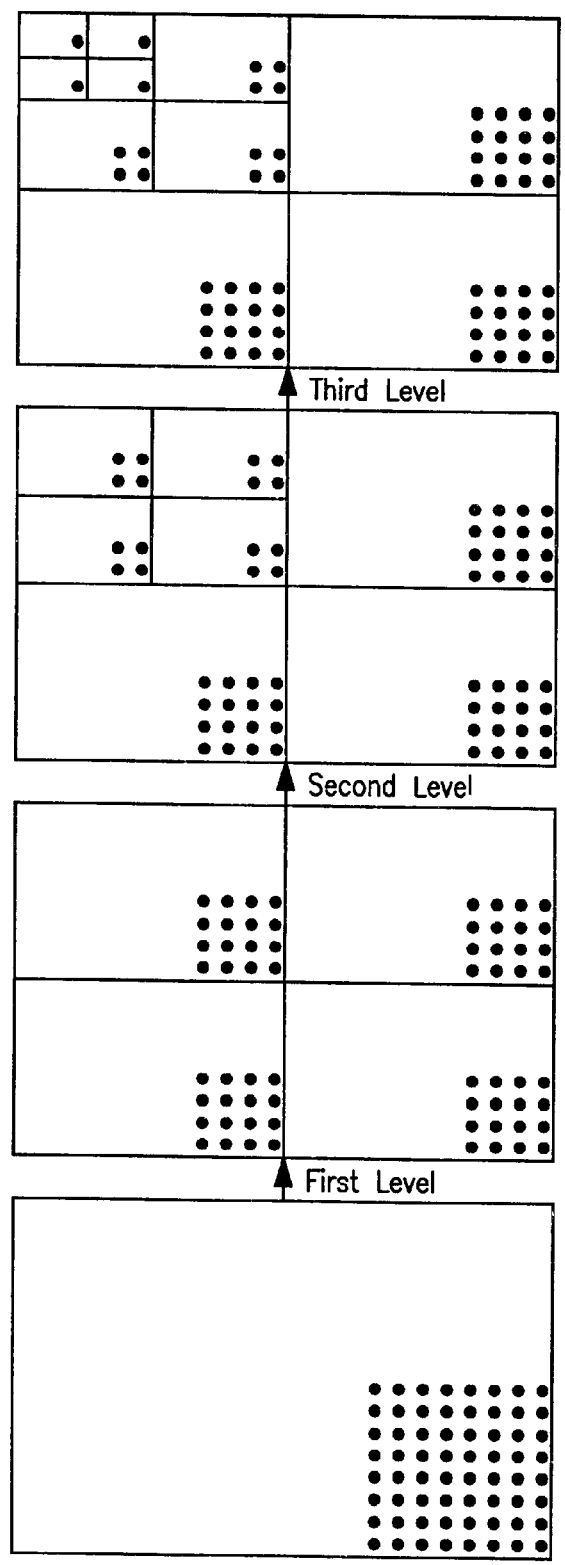
FIG. 14 shows an example of conventional wavelet decomposition with three levels of decomposition.

FIG. 14 shows an example of conventional wavelet decomposition with three levels of decomposition.

Figure 15:
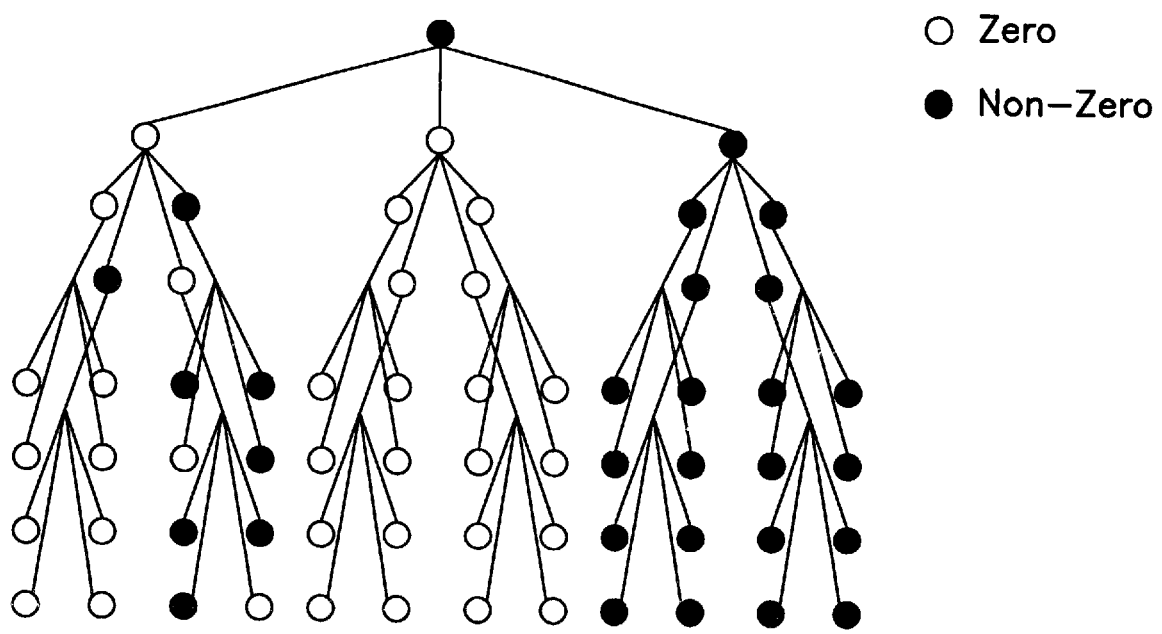
FIG. 15 shows a conventional zero tree.

FIG. 15 shows a conventional zero tree where the filled dots indicate non-zero and the unfilled dots indicate zero.

FIG. 16 shows an example of a zero tree with "don't care" nodes. Again, the filled dots indicate non-zero and the unfilled dots indicate zero. In this case, the unfilled squares indicate "don't care". In the example of FIG. 16, the four "children" of node 1601 (which is non-zero) are all either zero or "don't care", so the node can be made a zero tree node. This same would be true, for example, of the node 1602.

Figure 17:
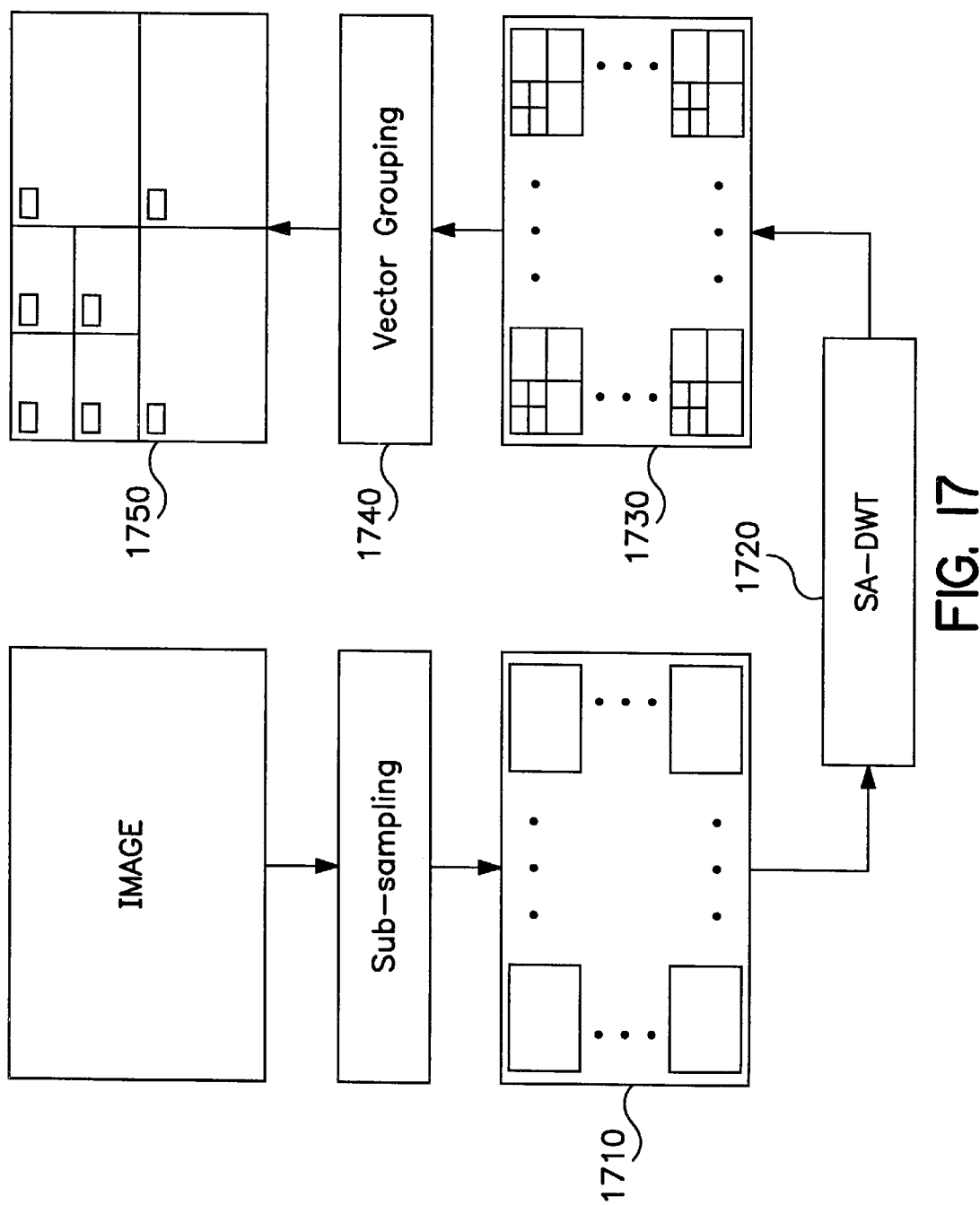
FIG. 17 is a diagram showing how shape adaptive discrete wavelet transform can be utilized in a vector transform system.

FIG. 17 is a diagram showing how shape adaptive discrete wavelet transform (SA-DWT) can be utilized in a vector transform system of the type shown in U.S. Pat. No. 5,436, 985, which is incorporated herein by reference. The image can be sub-sampled, resulting in the sub-sampled images depicted in block 1710. After the shape adaptive discrete wavelet transform process hereof (block 1720) the sub-sample images are shown in block 1730. The vector grouping is indicated by the block 1740, and the result thereof is depicted in block 1750. This can be followed, for example, by vector quantization, as described in the referenced Patent, or by transformed vector quantization as disclosed, for example, in copending U.S. patent application Ser. No. 08/884,440, filed of even date herewith, and assigned to the same assignee as the present application, and also incorporated herein by reference.

What is claimed is:

1. A method for encoding an image-representative signal, comprising the steps of:

for shapes of said image, applying a transform to a segment of pixels of said shape to obtain a low pass transform component and high pass transform component; and for segments with a total number of (2N−1) pixels, including the (2N−1)th pixel in the low pass transform component and excluding the (2N−1)th pixel from high pass transform component, where N is a positive integer.

2. The method as defined by claim 1, further comprising scaling the transform of said odd pixel.

3. The method as defined by claim 2, wherein said segment of pixels comprises a sequence of pixels having non-zero values.

4. A method for wavelet encoding image-representative signals, comprising the steps of:

identifying shape information of a shape in the image; within each row of pixels in the shape, identifying a segment of consecutive pixels;

for an even number of consecutive pixels, $N_i$, performing a wavelet transformation on the $N_i$ pixels to generate $N_i/2$ low pass wavelet coefficients and $N_i/2$ high pass wavelet coefficients, and for an odd number of pixels, $N_i$, performing a wavelet transformation on the first $N_i-1$ pixels to generate $(N_i-1)/2$ low pass wavelet coefficients and $(N_i-1)/2$ high pass wavelet coefficients and scaling the left over pixel with the low pass coefficients at an end of the segment;

repeating said wavelet transformations a number of times to obtain wavelet decomposition; and repeating said wavelet decomposition steps for further rows of pixels in the shape.

5. The method as defined by claim 4, wherein said wavelet coefficients are placed into locations that depend on said shape information.

6. The method as defined by claim 3, wherein said wavelet decomposition is performed for a further segment of consecutive pixels of a row of said shape.

7. The method as defined by claim 5, wherein the recited wavelet decomposition is also performed for columns of said shape.

8. The method as defined by claim 5, wherein, when $N_i$ is less than the number of taps of the wavelet filter used for wavelet transformation, applying a Haar wavelet transformation.

9. The method as defined by claim 4, wherein said wavelet decomposition is performed for a further segment of consecutive pixels of a row of said shape.

10. The method as defined by claim 4, wherein the recited wavelet decomposition is also performed for columns of said shape.

11. The method as defined by claim 4, wherein, when $N_i$ is less than the number of taps of the wavelet filter used for wavelet transformation, applying a Haar wavelet transformation.

\* \* \* \* \*